(12) United States Patent
Hamamoto et al.

(10) Patent No.: US 7,139,908 B2
(45) Date of Patent: Nov. 21, 2006

(54) INFORMATION PROCESSING APPARATUS AND MEMORY UPDATE METHOD IN THE APPARATUS

(75) Inventors: Akihiko Hamamoto, Kanagawa (JP); Tetsuya Kawanabe, Kanagawa (JP); Takao Aichi, Tokyo (JP); Kazuyuki Masumoto, Kanagawa (JP); Fumihiro Goto, Kanagawa (JP); Makoto Hibi, Kanagawa (JP); Tetsuya Suwa, Kanagawa (JP); Mitsuhiro Ono, Tokyo (JP); Masato Oshima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 115 days.

(21) Appl. No.: 10/435,084

(22) Filed: May 12, 2003

(65) Prior Publication Data

US 2003/0214674 A1    Nov. 20, 2003

(30) Foreign Application Priority Data

May 14, 2002    (JP)    ............................. 2002/139062

(51) Int. Cl.
*G06F 9/00*    (2006.01)
(52) U.S. Cl. ........................................................ 713/2
(58) Field of Classification Search ................ 713/300, 713/2
See application file for complete search history.

(56) References Cited

U.S. PATENT DOCUMENTS

| | | | | |
|---|---|---|---|---|
| 5,268,928 A | * | 12/1993 | Herh et al. | 375/222 |
| 5,835,761 A | * | 11/1998 | Ishii et al. | 713/100 |
| 6,237,091 B1 | * | 5/2001 | Firooz et al. | 713/1 |
| 6,330,069 B1 | * | 12/2001 | Kim | 358/1.14 |
| 6,529,589 B1 | * | 3/2003 | Nelson et al. | 379/102.01 |
| 6,604,194 B1 | * | 8/2003 | Nam | 713/2 |
| 7,007,077 B1 | * | 2/2006 | Shinohara et al. | 709/220 |

* cited by examiner

*Primary Examiner*—James K. Trujillo
*Assistant Examiner*—Eric Chang
(74) *Attorney, Agent, or Firm*—Fitzpatrick, Cella, Harper & Scinto

(57) ABSTRACT

An information processing apparatus comprising a power unit, a first control unit and a second control unit in which power supply is controlled based on a control signal from the first control unit, wherein when electric power supply from the power supply unit has been stopped and then the electric power supply from the power supply unit has been started, if update of a memory of the first control unit has been instructed, the first control unit transfers the content of a flash ROM in the first control unit into the memory thus updates the content of the memory. At this time, the second control unit is kept in a power-off status by a control signal line until the update of the memory is completed. After the completion of the update, power-on is notified by the control signal line, and the reset status of the second control unit is released.

19 Claims, 15 Drawing Sheets

FIG. 14B

| START/DESIGNATE | ▶ 001 | ◀ | |
|---|---|---|---|
| END | | ×01 | NUMBER OF COPIES |
| PAPER TYPE | [A] B  C  D  E  F  G  H | | |
| LAYOUT | ☐ ☐ ☐ ☐ ☐ ☐<br>[1]  1  2  4  8  16 | | |
| QUALITY | [OFF]     ON | | |
| DATE PRINTING | [OFF]     ON | | |
| IMAGE CORRECTION | [OFF]     ON | | |
| NUMBER OF SHEETS | 1 | | |

INDEX    ALL FRAMES    1 FRAME    DESIGNATED FRAME    DPOF    MODE

○    ○    ●    ○    ○         ○ MAINTENANCE

START PRINTING    STOP PRINTING

INFORMATION PROCESSING APPARATUS AND MEMORY UPDATE METHOD IN THE APPARATUS

FIELD OF THE INVENTION

The present invention relates to an information processing apparatus and a memory update method in the apparatus.

BACKGROUND OF THE INVENTION

In recent years, an information processing apparatuses constituted with plural modules, in which programs including a control program and a control modules are stored in a flash ROM in preparation for short-term development or after-sales function update or bag correction, is rapidly becoming popular.

On the other hand, attention to the environment is further increased in commercial scene, and various ideas to reduce electric consumption in waiting time and off status have been made. For example, with an electric power control module as a main module, respective control modules are interconnected with plural control signals or communication signals, and the respective modules change the status of electric power under the control of the electric power control module.

In this information processing apparatus, the control module program (hereinafter, simply referred to as a "control module") including peripheral control functions of a power switch must be rewritten in a particularly careful manner. If the rewriting of the control module fails, there is a possibility that even the electric power of the apparatus cannot be turned ON again. For this reason, generally, the rewriting of the flash ROM holding the control module including the peripheral control functions of the power switch is still in a developmental stage but is not open to the users.

As described above, several restrictions are placed on the operation of rewriting of the control module including the peripheral control functions of the power switch, and the greatest restriction is to unplug an AC power source when the rewriting has been completed, then after some period of time, plug the AC power again, i.e., to perform hard reset after the completion of rewriting.

Further, notification of in-rewriting status or completion of the rewriting of the control module is limited to display on an LED or the like, and still insufficient to general users.

SUMMARY OF THE INVENTION

The present invention has been made in consideration of the above situation, and has its object to provide an information processing apparatus in which a malfunction upon update of a memory in a control unit and a memory update method in the apparatus.

Further, another object of the present invention is to provide an information processing apparatus in which, if the content of its memory has been updated, information on whether or not memory update has been made and information on the content of update can be checked by a user when the electric power is turned on, and a memory update method in the apparatus.

A further object of the present invention is to provide an information processing apparatus for processing data received from an externally-connected apparatus, including a first control unit having a memory for storing a program, adapted to perform data transmission/reception with the externally-connected apparatus in accordance with the program; and a second control unit, supplied with the electric power by a control signal from the first control unit, adapted to process data received via the first control unit; wherein upon update of the program stored in the memory, the first control unit transmits the control signal to the second control unit after the update of the program has been completed; and a method therefor.

It is yet another object of the present invention to provide an image printing apparatus for printing based on data received from an externally-connected apparatus, including a control unit having a memory for storing a program and a CPU for controlling data transmission/reception with the externally-connected apparatus in accordance with the program; a printer engine, being initialized by a control signal indicating power-on from the control unit, adapted to perform printing based on data received via the control unit; a power source unit, connected to a commercial AC power source, adapted to supply electric power to the printer engine; determination means for, in a case where the electric power supply from the power source unit has been stopped and then the electric power supply from the power source unit has been started, determining whether or not update of the program stored in the memory has been instructed; and an update means for, if the determination means determines that the update of the program has been instructed, updating the program. After completion of the update of the program by the update means, the control unit transmits the control signal to the printer engine.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 14A and 14B depict display examples upon power-up, changed in correspondence with update of a flash ROM, respectively in the case of update and in other cases.

DETAILED DESCRIPTION OF THE PREFERRED EMBODIMENT

A preferred embodiment of the present invention will now be described in detail in accordance with the accompanying drawings. Note that in the present embodiment, a printing apparatus (photo-direct printer apparatus) which has a PC card slot and which employs an ink-jet method as a printing method will be described. However, the present invention is not limited to this apparatus but applicable to a computer apparatus such as a personal computer and an input/output apparatus such as a printer apparatus.

Figure 1:
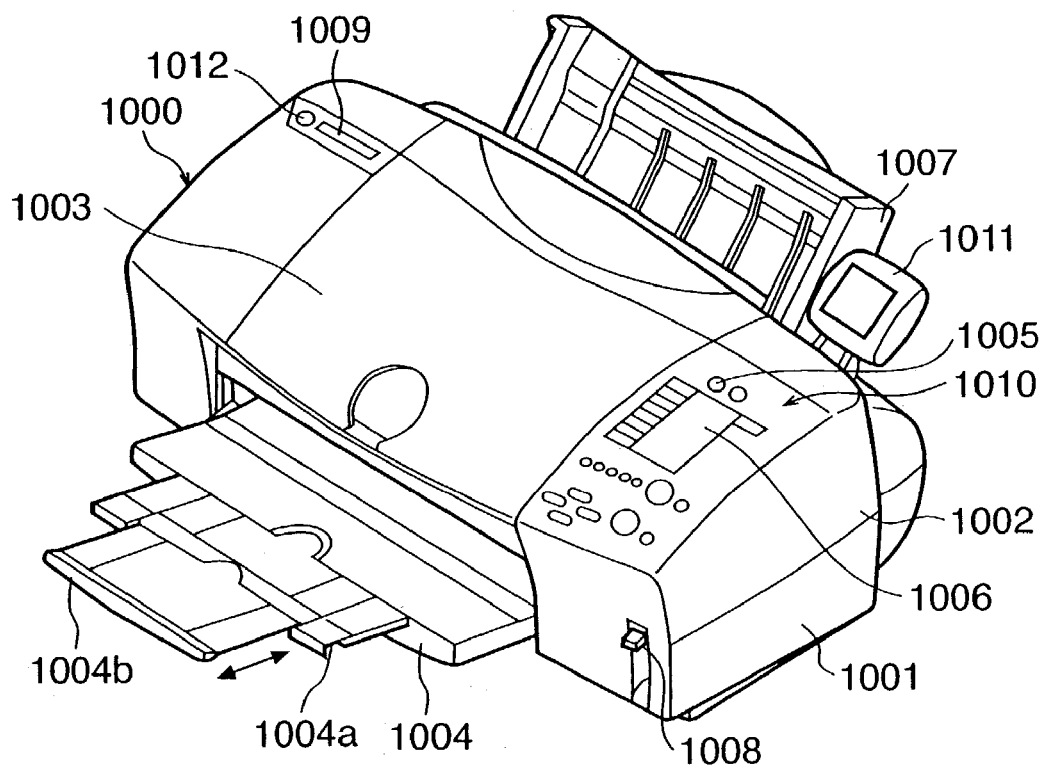
FIG. 1 depicts an external perspective view of a photo-direct printer apparatus according to an embodiment of the present invention.

FIG. 1 depicts an external perspective view showing a photo-direct printer apparatus 1000 according to the embodiment of the present invention. The photo-direct printer apparatus has a general PC printer apparatus function of receiving data from a host computer (PC) and print-outputting the data, and a function of directly reading image data stored in a storage medium such as a memory card and print-outputting the data, or directly receiving image data from a digital camera and print-outputting the data.

In FIG. 1, the main body which defines the casing of the photo-direct printer apparatus 1000 according to the present embodiment has a lower case 1001, an upper case 1002, an access cover 1003 and a discharge tray 1004 as casing members. The lower case 1001 forms almost the lower half of the apparatus 1000, whereas the upper case 1002 forms almost the upper half of the main body. A combination of these cases forms a hollow structure with a storage space where each mechanism to be described later is accommodated. The upper and front surfaces of the cases have openings. The discharge tray 1004 is rotatably held at one end by the lower case 1001, and the opening in the front surface of the lower case 1001 is opened/closed by rotating the discharge tray 1004. To execute print operation, the discharge tray 1004 is rotated toward the front surface side to open the opening. Print sheets can be discharged from the opening, and the discharged print sheets can be sequentially stacked. The discharge tray 1004 houses two auxiliary trays 1004a and 1004b. These trays are selectively pulled out to enlarge/reduce the paper support area in three stages in accordance with necessity.

The access cover 1003 is rotatably held at one end by the upper case 1002 so as to open/close the opening formed in the upper surface. Opening the access cover 1003 enables exchanging a print head cartridge (not shown), ink tank (not shown) or the like accommodated in the main body. Although not shown, a projection formed on the back surface of the access cover 1003 rotates a cover opening/closing lever when the access cover 1003 is opened/closed. The lever rotation position is detected by a micro switch or the like, thereby detecting the open/closed state of the access cover.

A power switch 1005 is provided with the upper surface of the upper case 1002. An operation panel 1010 having a liquid crystal display 1006, various key switches, and the like is arranged on the right side of the upper case 1002. The structure of the operation panel 1010 will be described in detail with reference to FIG. 2. Reference numeral 1007 denotes an automatic feeder which automatically feeds print sheets into the apparatus main body; numeral 1008 denotes a paper interval selection lever for adjusting the interval between the print head and the print sheet; and numeral 1009 denotes a card slot into which an adapter capable of mounting a memory card is inserted. Image data stored in a memory card can be directly received and printed via the adapter. The memory card (PC) includes, e.g., a compact flash memory$^{TR}$, smart media$^{TR}$ and a memory stick$^{TR}$. Numeral 1011 denotes a viewer (liquid crystal display) which is detachable from the apparatus main body and is used for display of image of one frame, an index image and the like when images stored in the PC card are searched for an image to be printed; and numeral 1012 denotes a terminal for connection with a digital camera to be described later. Note that a USB bus connector for connection with a personal computer (PC) is provided with the rear surface of the apparatus main body.

Figure 2:
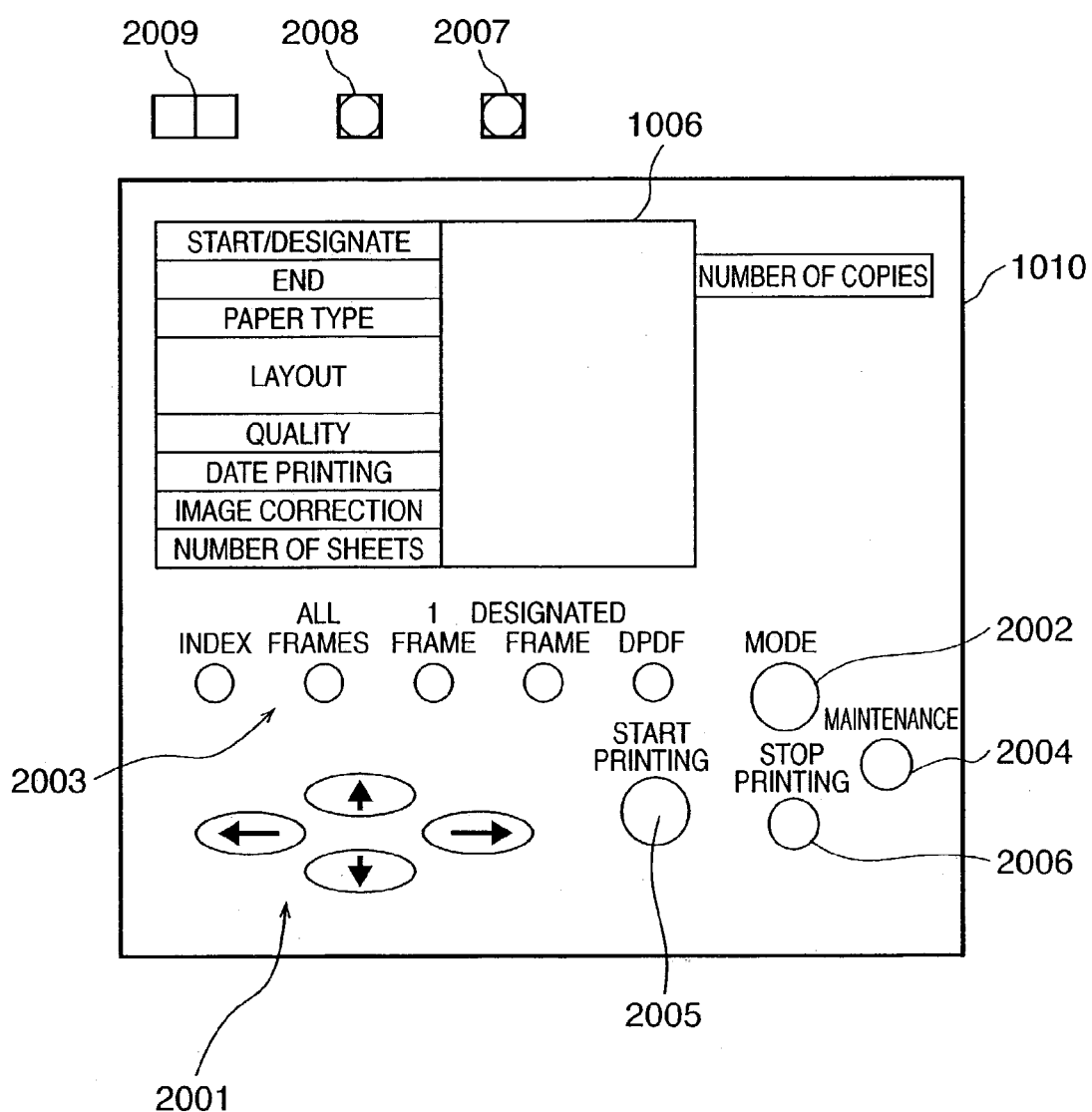
FIG. 2 depicts a schematic view of an operation panel of the photo-direct printer apparatus according to the embodiment.

FIG. 2 is a schematic view showing the operation panel 1010 according to the present embodiment.

In FIG. 2, the liquid crystal display 1006 displays menu items for various settings of data on items printed on the right and left of the display 1006. The displayed items are the first photograph number of a print range, a designated frame number (start/designate), the last photograph number of the print range (end), the number of prints (number of copies), the type of paper (print sheet) used for printing (paper type), setting of the number of photographs to be printed on one paper sheet (layout), designation of print quality (quality), designation as to whether or not a photographing date is printed (date printing), designation whether or not a photograph is corrected and printed (image correction), and display of the number of paper sheets necessary for printing (number of paper sheets). These items are selected or designated with cursor keys 2001. Numeral 2002 denotes a mode key which allows selection of the type of printing (index printing, printing of all frames, printing of one frame, and the like) every time this key is depressed, and one of LEDs of LED 2003 is turned on in correspondence with the depressed key. Numeral 2004 denotes a maintenance key for performing printer maintenance such as cleaning of the print head 1301 and for print area designation mode; numeral 2005 denotes a print start key which is depressed to designate the start of printing or establish maintenance setting; and numeral 2006 denotes a print stop key which is depressed to stop printing or designate to stop a maintenance processing.

Further, a depressible power switch 2008, a resume switch 2007 and 2-color LED 2009 indicating the operation status of the printer engine 3004 (FIG. 3) are provided in an upper part of the operation panel 1010. Respective input signals from the resume switch 2007 and the power switch 2008 are also outputted to the printer engine 3004 under the management of a switch I/F module of an ASIC 3001 (FIG. 3) to be described later.

Next, the arrangement of principal elements relating to control of the photo-direct printer apparatus 1000 according to the present embodiment will be described with reference to FIG. 3. Note that in FIG. 3, elements corresponding to those in the above-described figures have the same reference numerals and explanations of the elements will be omitted.

Figure 3:
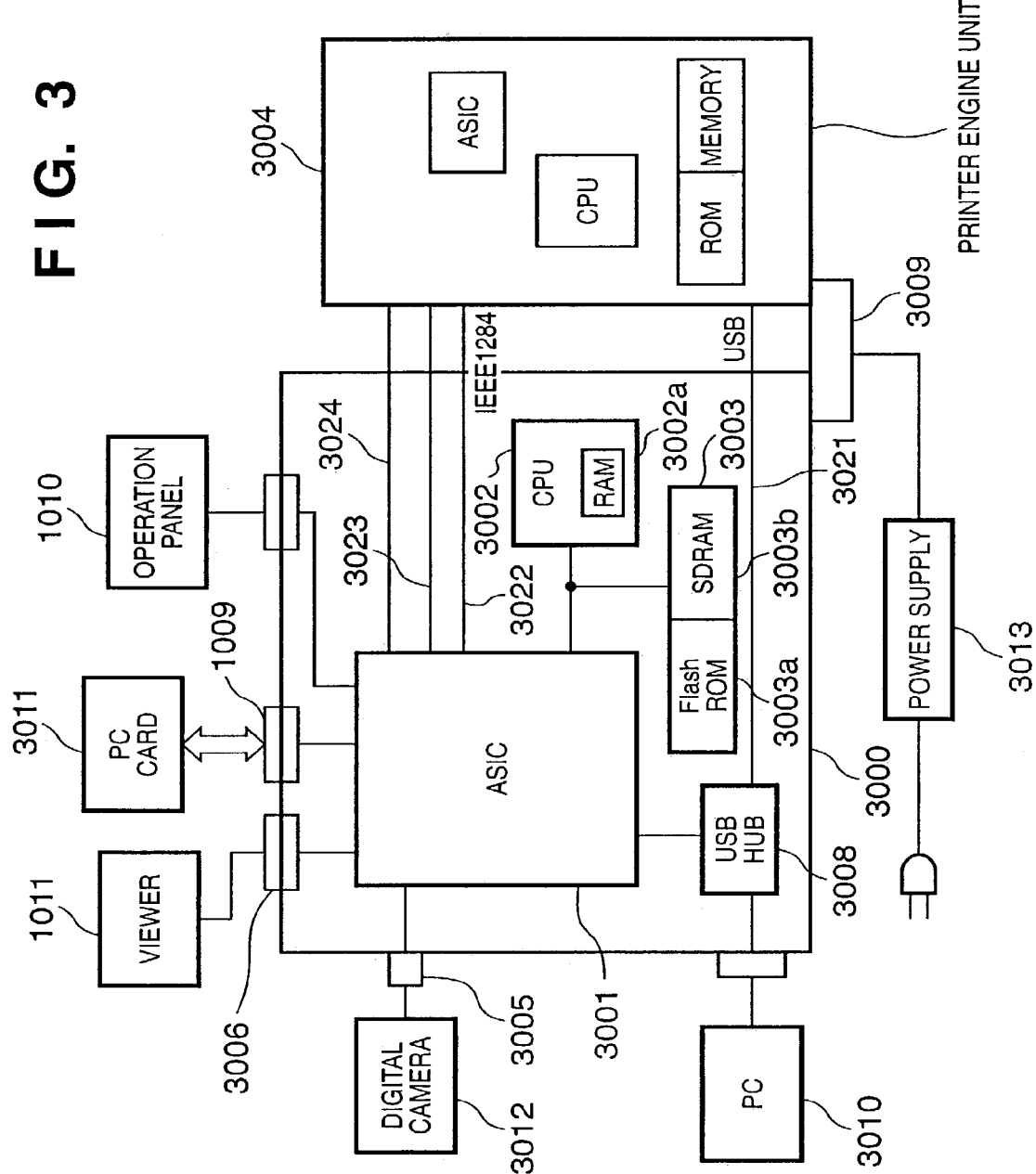
FIG. 3 depicts a block diagram showing the construction of principal elements relating to control of the photo-direct printer apparatus according to the embodiment.

In FIG. 3, numeral 3000 denotes a controller (control board); numeral 3001 denotes an ASIC (application specific LSI); and numeral 3002 denotes a CPU which performs various control processings to be described later, image processings and the like. Further, the CPU 3002 includes a 64 Kbyte internal RAM (IRAM) 3002*a* which can also operate as a secondary cash. Numeral 3003 denotes a memory having a 2 Mbyte flash ROM 3003*a* for storing the control program of the CPU, and an 8 Mbyte SDRAM 3003*b* for storing a program upon execution of program, which functions as a work memory for storing image data; numeral 3004 denotes a printer engine which is an ink-jet print type printer engine for printing a color image by using a plurality of color inks; numeral 3005 denotes a USB connector serving as a port for connection with a digital camera 3012; numeral 3006 denotes a connector for connection with the viewer 1011; and numeral 3008 denotes a USB hub (USB hub) which transmits data from a PC 3010 to the printer engine 3004 via an internal USB bus 3021 when the printer apparatus 1000 performs printing based on image data from the PC 3010. The connected PC 3010 can directly exchange data and signals with the printer engine 3004 and execute printing (functions as a general PC printer). Numeral 3009 denotes a power connector which receives a DC voltage converted from a commercial AC voltage from an electric power supply 3013. The PC 3010 is a general personal computer device. Numeral 3011 denotes a memory card (PC card) described above; and numeral 3012 denotes the digital camera.

Note that signal exchange between the controller 3000 and the printer engine 3004 is performed via the above-described internal USB bus 3021 or an IEEE 1284 bus 3022.

Further, two switch signal lines 3023 indicating statuses of signals from the power switch 2008 and the resume switch 2007, and an engine reset signal line 3024 to reset the control module (CPU or ASIC) in the printer engine 3004 are connected between the controller 3000 and the printer engine 3004.

Note that in a status where the AC power source is unplugged, an engine reset signal for resetting a control module inside the printer engine 3004 is at a Low state, and in processing by an initializer to be described later when the AC power source is plugged, the engine reset signal is set to High. Further, upon update of a control module stored in a memory in the controller 3000, to set the printer engine 3004 in a reset status, the ASIC 3001 controls the engine reset signal to be Low state. The reset status of the printer engine means that the printer does not operate even if the printer is operated by the user. In this status, even if the user depresses the power switch 2008, the power of the printer is not turned ON/OFF, and further, even if the user opens the access cover 1003, the operation of the print head is not performed.

The two switch signal lines 3023 respectively transmit signals corresponding to depressed statuses of the resume switch 2007 and the power switch 2008 provided on the operation panel 1010, selectively to transmit the depressed statuses of the switches 2007 and 2008 directly to the printer engine 2004 (through mode) or to transmit the statuses as signals emulated by the controller 3000 to the printer engine 3004 (CPU mode), in correspondence with the setting of a switch I/F function unit in the ASIC 3001 to be described later.

Figure 4:
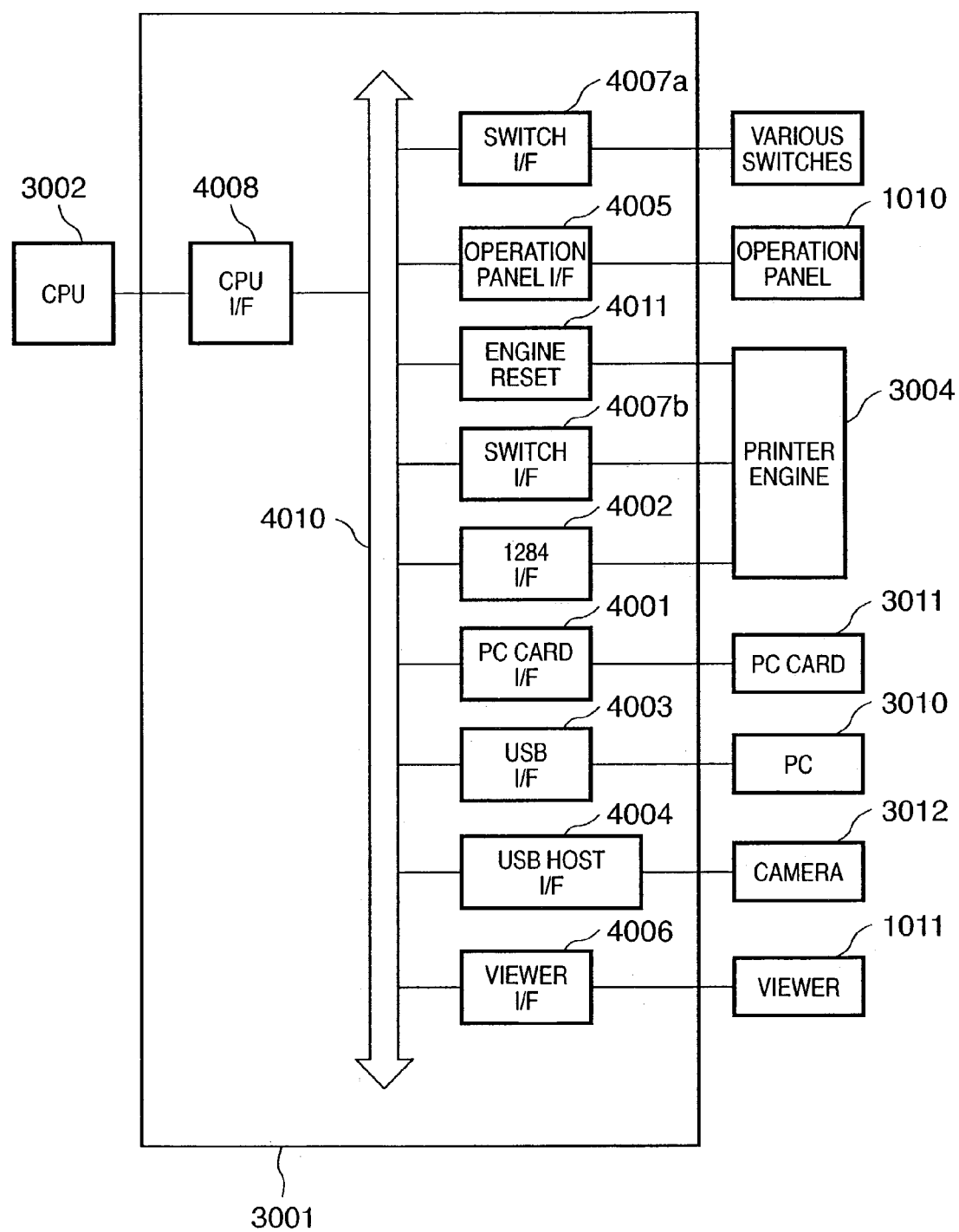
FIG. 4 is a block diagram showing the construction of ASIC of the photo-direct printer apparatus according to the embodiment.

FIG. 4 is a block diagram showing the construction of the ASIC 3001. Also in FIG. 4, elements corresponding to those in the above-described figures have the same reference numerals, and explanations thereof will be omitted.

Reference numeral 4001 denotes a PC card interface which reads image data stored in the mounted PC card 3011 or writes data in the PC card 3011; and numeral 4002 denotes an IEEE 1284 interface which exchanges data with the printer engine 3004. The IEEE 1284 interface is a bus used for print-outputting image data stored in the digital camera 3012 or PC card 3011. Numeral 4003 denotes a USB interface which exchanges data with the PC 3010; numeral 4004 denotes a USB host interface which exchanges data with the digital camera 3012; numeral 4005 denotes an operation panel interface which receives various operation signals from the operation panel 1010 or outputs display data to the display 1006; numeral 4006 denotes a viewer interface which controls display of image data on the viewer 1011; reference sign 4007*a* denotes an interface which controls an interface with the above-described resume switch 2007, the power switch 2008 and the LED 2009; and reference sign 4007*b* denotes a switch I/F which controls an interface with various switches of the printer engine 3004.

Numeral 4011 denotes a register for reset control of the printer engine 3004. Different from the other modules in the ASIC which are automatically initialized by the ASIC after the reset start, the register is not automatically initialized after the reset start, and is initialized to an initial value when electric power supply is completely stopped (power reset). That is, it can be determined whether simple reset is performed or the electric power supply 3013 is turned ON/OFF i.e. hard reset is performed by insertion/extraction of the AC power, by referring to the value of the register 4011. Numeral 4008 denotes a CPU interface which controls data exchange with the CPU 3002; and numeral 4010 denotes an internal bus (ASIC bus) which interconnects these elements.

Note that in the photo-direct printer apparatus 1000 according to the present embodiment, the CPU 3002 performs control on the respective elements of the apparatus, in addition to the image processing, in accordance with the control program stored in the memory 3003 in FIG. 3.

Figure 5:
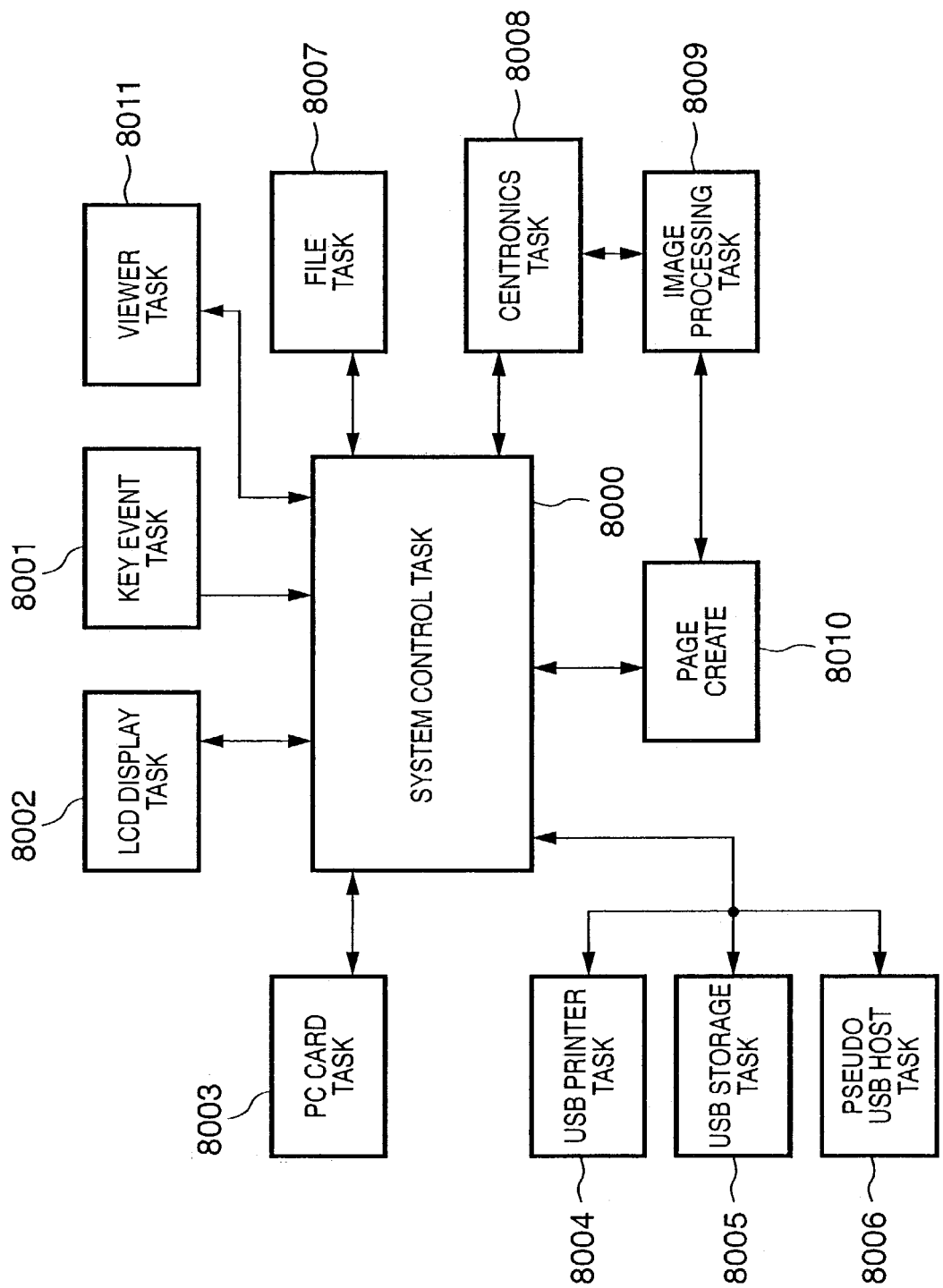
FIG. 5 is a block diagram showing a multitask structure including tasks for function modules in a control program of the photo-direct printer apparatus according to the embodiment.

This control program is arranged in a multitask form in which a task is created for each functional module. FIG. 5 shows a main task structure.

In FIG. 5, reference numeral 8000 denotes a system control task which arbitrates an entire system by, e.g., issuance of each event between tasks, control of sequence at the end of an event, and exclusive processing; numeral 8001 denotes a key event task which analyzes a depressed key on the basis of key operation at the operation panel 1010; numeral 8002 denotes a display task for the LCD 1006, which is activated when a UI control request, message display request or the like is made on the display 1006, and which executes display control to the display 1006; numeral 8003 denotes tasks activated by reading/writing data from/in the PC card 3011; and numeral 8004 denotes a USB printer task activated by data transfer from the PC 3010 connected via the USB bus. The USB printer task 8004 is activated by a printer interrupt sent via a USB bus, and executes a function as a PC printer. Numeral 8005 denotes a USB storage task which is activated by the system control task 8000 and which initializes firmware. The USB storage task 8005 starts/ends a USB control task and USB bulk task as lower tasks in accordance with a message from the system control task 8000. Numeral 8006 denotes a pseudo USB host task which is activated by the USB task and which executes data read from the digital camera 3012 connected via a USB bus and various types of communication controls. Numeral 8007 denotes a file task which performs input/output control such as file open, file close, file read, and file write.

Numeral 8008 denotes a Centronics task activated from a Centronics interface connected to the printer engine 3004. The Centronics task 8008 executes DMA transmission of print data, status reply, and the like. Numeral 8009 denotes an image processing task which receives RGB data, generates YMCK data by 3D processing, tetrahedron interpolation, color conversion, scaling, and error diffusion, and finally generates raster image data to be outputted to the printer engine 3004. Numeral 8010 denotes a page create task which expands JPEG data to convert it into image data, generates image data from data in a BMP format, or generates image data from an HTML document. In addition, the page create task 8010 performs image processing such as photograph data correction and grayscale correction, and generates RGB data. Numeral 8011 denotes a viewer task which executes display control to the viewer 1011 when the viewer 1011 has been connected.

Next, the arrangement of control code on a memory map will be described.

Figure 6:
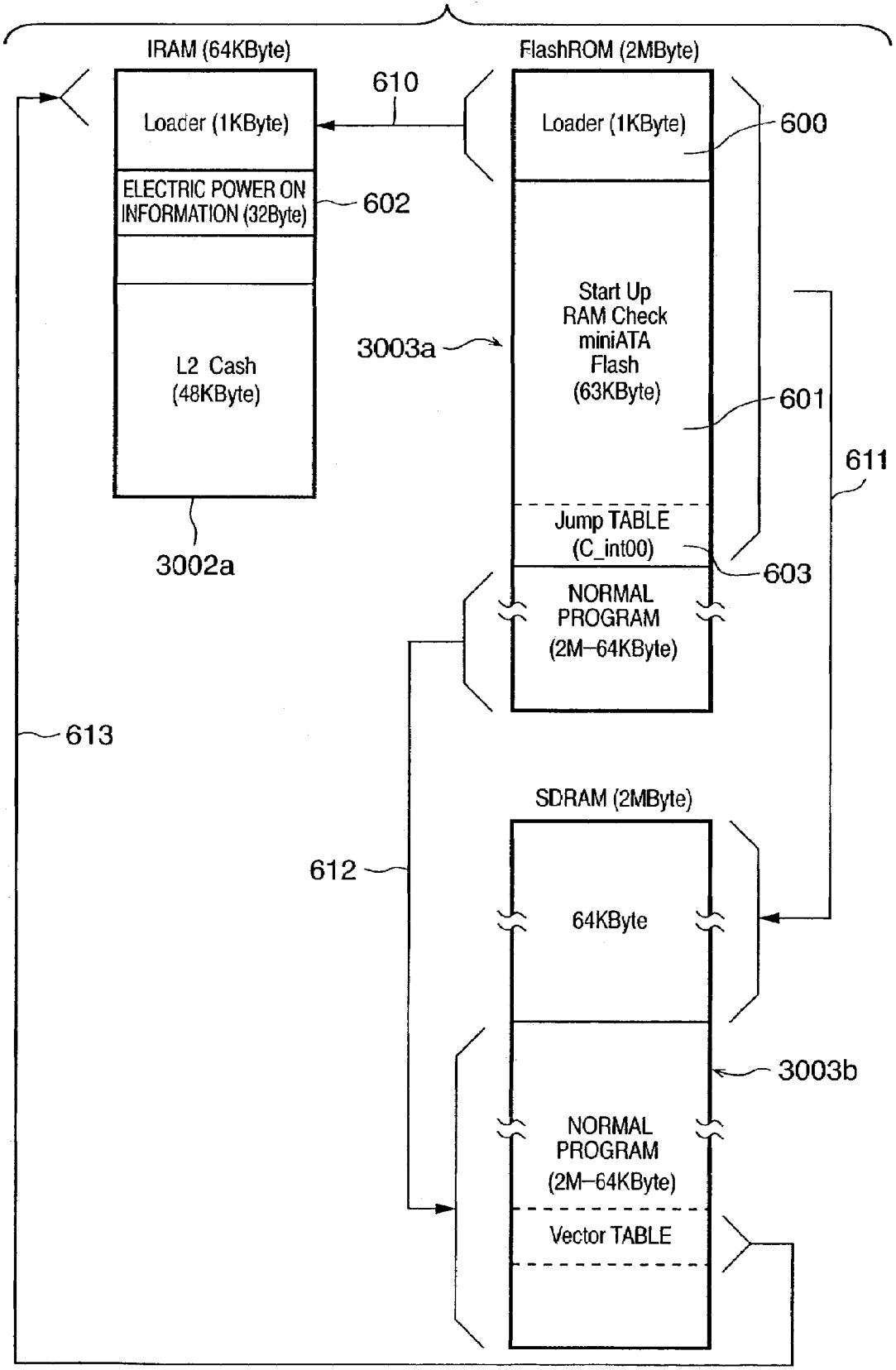
FIG. 6 depicts an explanatory view of memory map in the photo-direct printer apparatus according to the embodiment.

FIG. 6 is an explanatory view of a memory map for exchange of control data and program among the internal RAM (IRAM) 3002a, the flash RAM 3003a and the SDRAM 3003b.

The above-described control code is stored in the flash ROM 3003a which is an electrically-rewritable 2M byte ROM. In the present embodiment, special code necessary upon reset start is stored in higher-order 64 Kbytes of 2 Mbytes of the flash ROM 3003a, and program code to execute the respective tasks described in FIG. 5 is stored in the remaining (2 M-64 K) bytes.

The special code necessary upon the above-described reset start is constituted with a 1 Kbyte Loader 600 and a remaining 63 Kbyte Start Up 601. When the reset of the controller 3000 is released, the 1 k byte Loader 600 in the head 1 Kbytes of the flash ROM 3003a is automatically copied to 1 k bytes of the IRAM 3002a of the CPU 3002 (610 in FIG. 6). Next, 64 Kbytes from the head of the flash ROM 3003a, i.e., the special code is copied to 64 Kbytes from the head of the SDRAM 3003b (611 in FIG. 6).

Further, the program code stored in the flash ROM 3003a is copied in the SDRAM 3003b by start up processing (612 in FIG. 6) to be described later. Thereafter, the CPU 3002 reads the program code from the SDRAM 3003b, performs processing in accordance with the program code, thereby executes the various tasks to perform control processing in the printer apparatus according to the present embodiment. After the start up processing, a vector table of the SDRAM 3003a is copied in the IRAM 3002a (613 in FIG. 6).

Next, the relation between the above-described special code and normal code will be described with reference to the flowcharts of FIG. 7 and the subsequent figures.

Figure 7:
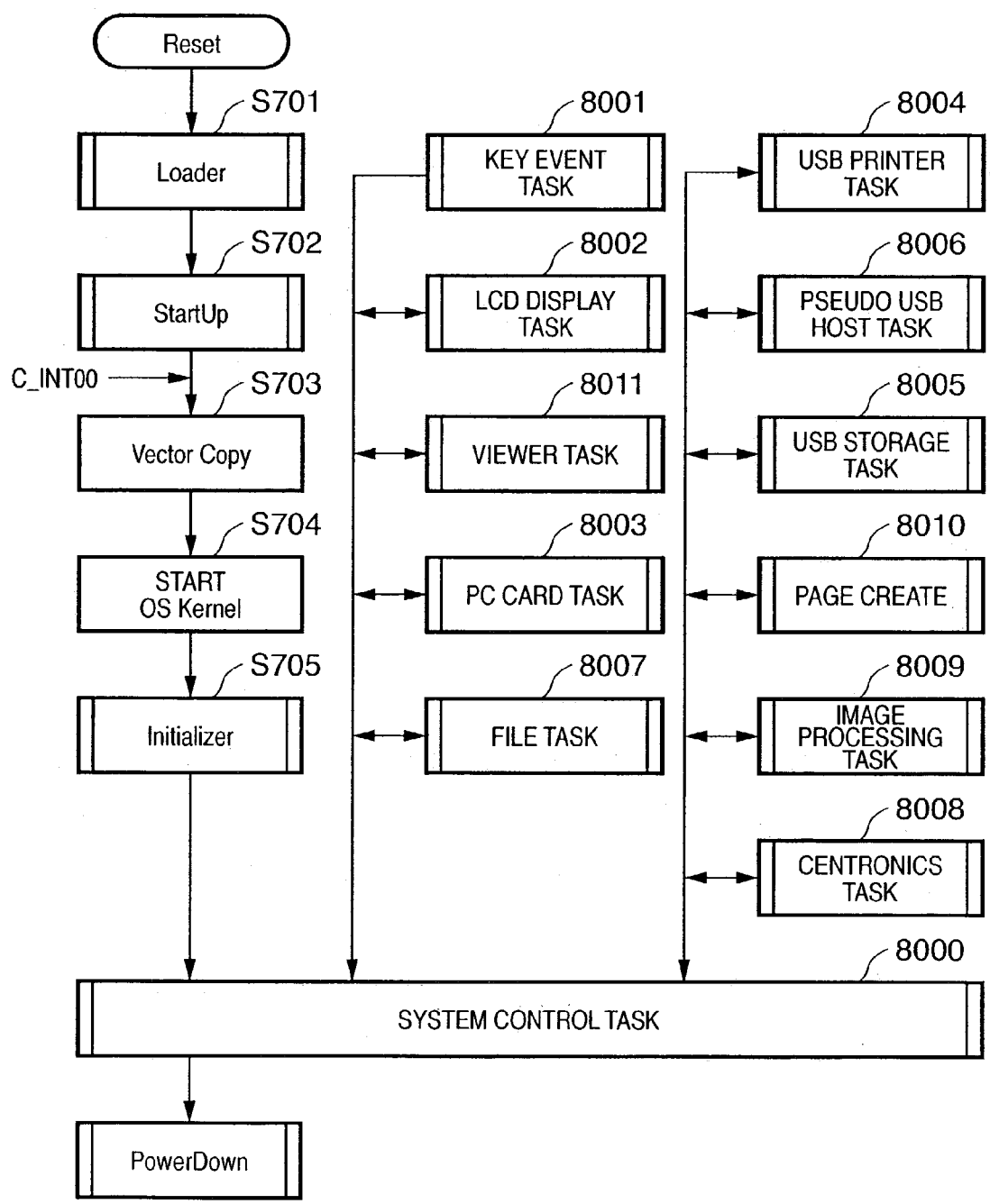
FIG. 7 is a flowchart showing the flow of entire processing in the photo-direct printer apparatus according to the embodiment.

FIG. 7 shows the flow of entire processing in the photo-direct printer apparatus 1000 according to the embodiment and the relation with the tasks in FIG. 5.

This processing is started when the controller 3000 has been reset and the reset is released, e.g., an AC outlet of the electric power supply 3013 is removed from a commercial AC power supply and then again connected to the commercial AC power supply.

Figure 8:
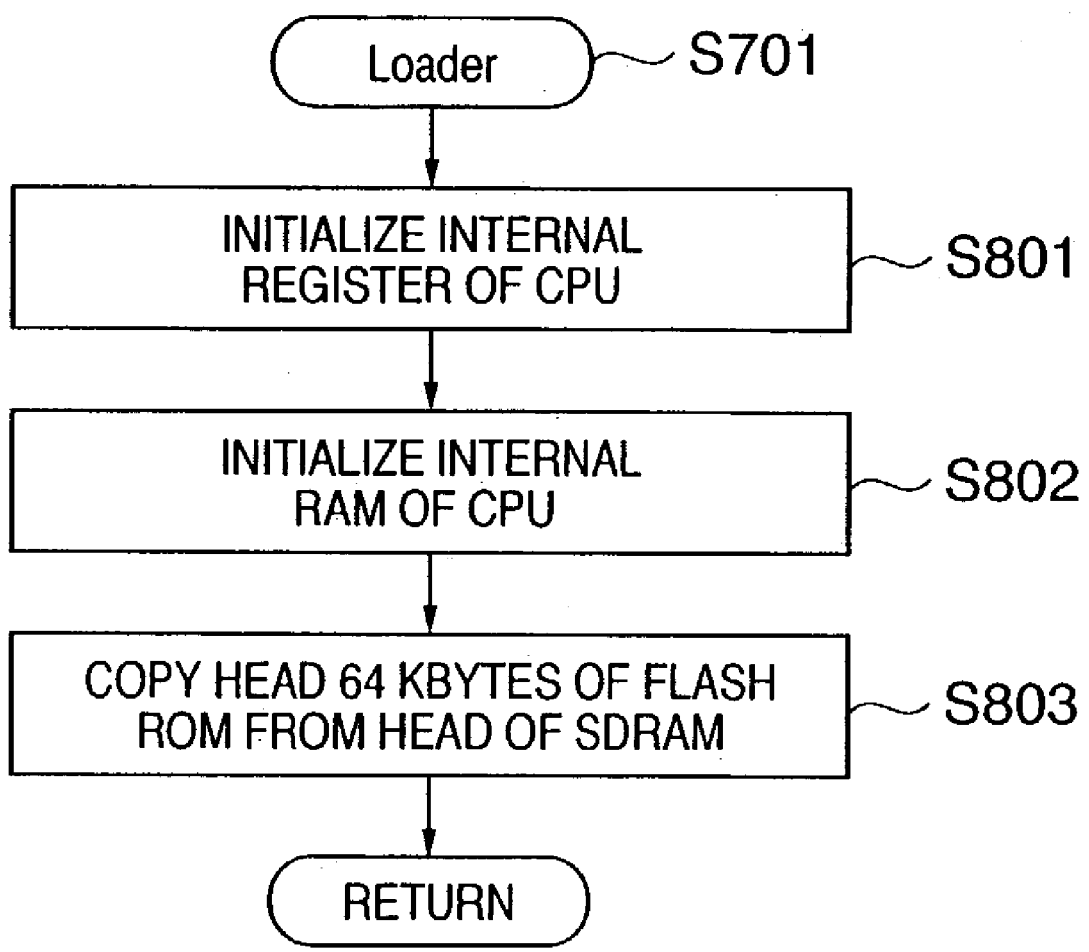
FIG. 8 is a flowchart showing processing in a loader of the photo-direct printer apparatus according to the embodiment.

First, at step S701, the Loader 600 stored in 1 k bytes from the head of the flash ROM 3003a is automatically copied by hardware in 1 k bytes from the head of the IRAM 3002a of the CPU 3002 (610 in FIG. 6). Then the program code of the Loader 600 is executed from the head address of the TRAM 3002a. Next, the process proceeds to step S702, at which the program code of the Loader 600 performs initialization of an internal register of the CPU (S801) as shown in the control flowchart of the Loader 600 in FIG. 8, then performs initialization of the remaining area (64 k–16 k) of the IRAM 3002a and setting of the internal register of the CPU to use lower 48 k bytes of the IRAM 3002a the register as a secondary cash (S802).

Note that a 32 byte area 602 (FIG. 6), following the head 1 k bytes of the IRAM 3002a, is ensured as an area for storing electric power-on information (normal mode, function check mode, factory mode, electricity check mode and update mode) discriminated in the start up processing to be described later.

Next, at step S803, as final processing in the Loader 600, 64 k bytes from the head of the flash ROM 3003a, i.e., the special code, is copied in 64 k bytes from the head of the flash ROM 3003b (611 in FIG. 6), and the processing by the Loader 600 ends.

Figure 9:
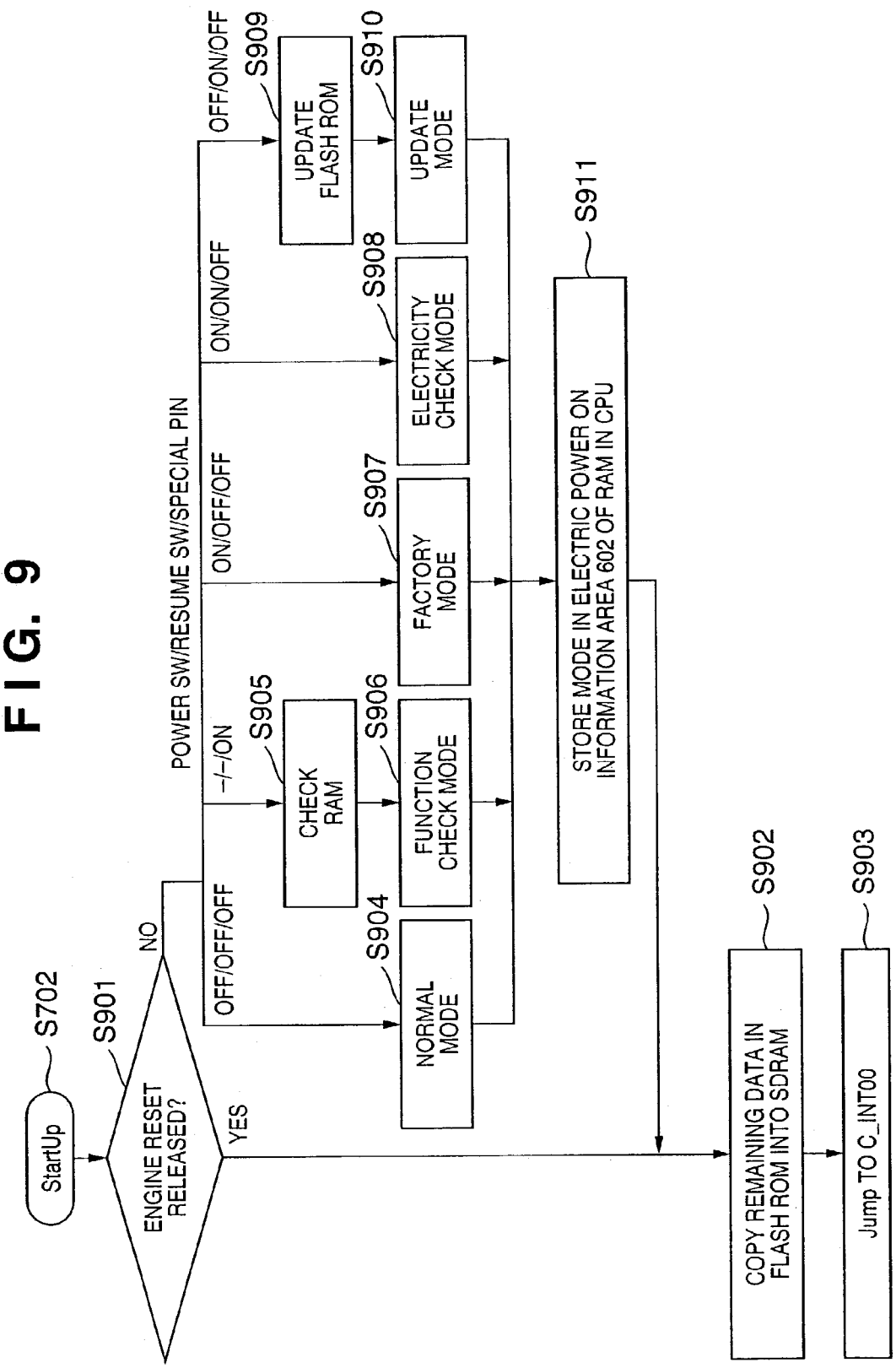
FIG. 9 is a flowchart showing start-up processing at step S702 in FIG. 7.

Next, the process proceeds to step S702 in FIG. 7, at which the process branches from the Loader 600 stored in the IRAM 3002a to the Start Up 601 stored in the SDRAM 3003b, then the program code of the Start Up 601 in FIG. 9 is executed.

FIG. 9 is a flowchart showing the processing (step S702) performed by the Start Up 601.

First, at step S901, it is determined, by referring to the engine reset register 4011 in the ASIC 3001 (FIG. 4), whether or not the reset of the printer engine 3004 has been already released, i.e., whether or not the printer engine 3004 has been reset by electric power-on. If the reset has been released, the process proceeds to step S902, at which, as a normal sequence, the remaining area of the flash ROM 3003a, i.e. the normal code portion is copied in the SDRAM 3003b (611 in FIG. 6). Then the process proceeds to step S903, at which the process branches to an address (80010000h) of 64 k bytes from the head of the SDRAM 3003b, where a jump code 603 (FIG. 6) to a head address C_INT00 of the normal routine is stored. This processing is performed, thereby the processing of the special code portion is ended, and the process moves to the normal code portion (S903).

On the other hand, if it is determined at step S901 that the reset has not been released, the process proceeds to corresponding processing in correspondence with the setting status of a special pin (not shown) provided on a board on which the above-described resume switch 2007, the power switch 2008 and the controller 3000 are provided. If all these elements are OFF, the process proceeds to step S904, at which the normal mode is set, and the process proceeds to step S911. If the special pin is set to ON, the process proceeds to step S905, at which the RAM of the controller 3000 is checked, then at step S906, the function check mode is set, and the process proceeds to step S911. If only the power switch 2008 is ON, the process proceeds to step S907, at which the factory (shipping) mode is set. If the resume switch 2007 and the power switch 2008 are simultaneously depressed, the process proceeds to step S908, at which the electricity check mode is set. Further, if only the resume switch 2007 is ON, the process proceeds to step S909, at which the flash ROM 3003a is updated, then at step S910, the update mode indicating that the flash ROM 3003a has been updated is set. When the processing has been completed, the process proceeds to step S911, at which mode information set at any of these steps S904, S906, S907, S908 and S910 is stored in the electric power-on information 602 of the IRAM 3002a, and the process proceeds to step S902.

In a case where the flash ROM 3003a is updated, the photo-direct printer apparatus 1000 is separated from the AC power supply, then, the AC outlet is connected to the AC power supply so as to supply AC power to the electric power supply 3013 while the resume switch 2007 is depressed. In this case, in the start up processing in FIG. 9, since it is determined at step S901 that the reset of the printer engine 3004 has not been released and only the resume switch 2007 is ON, the process proceeds to step S909, at which the flash ROM 3003a is updated.

Thus the start up processing in FIG. 9 has been completed, then at step S903, the process jumps to the address C_INT00, to proceeds to step S703 in FIG. 7. As shown in FIG. 6 (614), the vector table is copied in the IRAM 3002a, then at step S704, an OS kernel is started. Then at step S705, an Initializer is executed.

Figure 10:
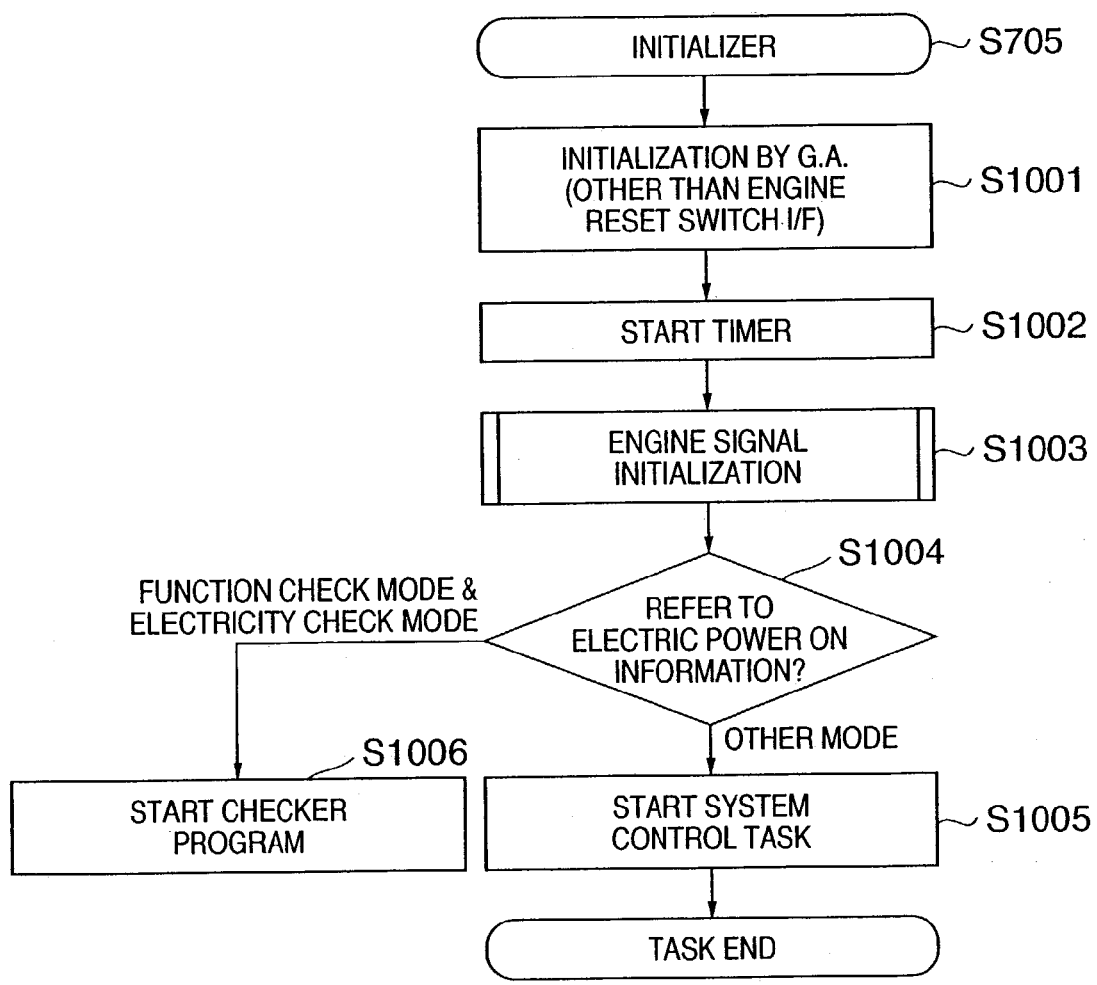
FIG. 10 is a flowchart showing initialization processing at step S705 in FIG. 7.

FIG. 10 is a flowchart showing the Initializer.

First, at step S1001, initialization is performed by a gate array (GA) for reset of the printer engine 3004. Next, the process proceeds to step S1002, at which a timer for task scheduling or the like is started, and at step S1003, initialization of an engine signal is performed. This processing will be described in detail with reference to the flowchart of FIG. 11. Next, at step S1004, the electric power-on information stored in the IRAM 3002a is read and it is determined whether or not the check mode such as the function check mode or the electricity check mode is set. If the check mode is set, the process proceeds to step S1006, at which a checker program for checking is started so as to perform checker processing. If other mode than the check mode is set, the process proceeds to step S1005, at which the system control task is started in correspondence with the set mode.

Figure 11:
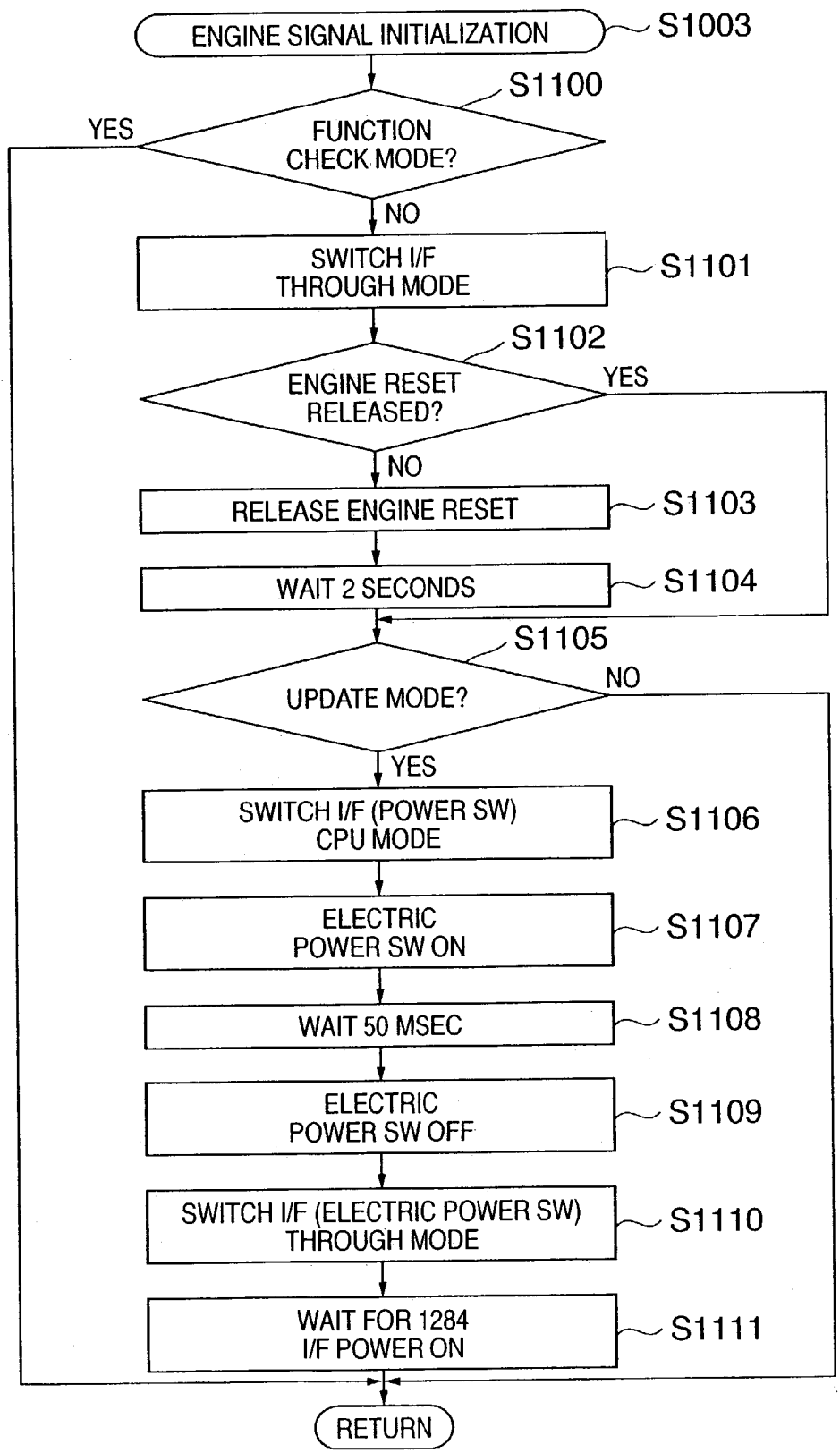
FIG. 11 is a flowchart showing engine signal initialization processing at step S1003 in FIG. 10.

FIG. 11 is a flowchart showing engine signal initialization processing at step. S1003 in FIG. 10.

First, at step S1100, it is determined whether or not the function check mode is set. If the function check mode is set, the process returns, otherwise, proceeds to step S1101, at which the switch I/Fs 4007a and 4007b shown in FIG. 4 are set to the through mode (the mode to transmit the signals from the resume switch 2007 and the power switch 2008 to the printer engine 3004). Next, the process proceeds to step S1102, at which it is determined whether or not the reset of the printer engine 3004 has been released. If the reset has been released, the process proceeds to step S1105, otherwise, proceeds to step S1103, at which the reset of the printer engine 3004 is released, then at step S1104, the process waits about 2 seconds.

Next, at step S1105, it is determined based on the mode information set in the electric power-on information 602 in the IRAM 3002a whether or not the flash ROM 3003a has been updated. If the flash ROM 3003a has not been updated, the process returns, on the other hand, if the flash ROM 3003a has been updated, the process proceeds to step S1106, at which the switch I/Fs 4007a and 4007b shown in FIG. 4 are set to the CPU mode (the mode to process the signal from the power switch 2008 by the controller 3000 and send the signal to the printer engine 3004). Next, the process proceeds to step S1107, at which the signal indicating the depression of the power switch 2008 (signal line 3023) is turned ON, then the process waits about 50 msec at step S1108, then at step S1109, the signal indicating the depression of the power switch 2008 (signal line 3023) is turned OFF. Thus, the turning-on of the power switch 2008 is notified to the printer engine 3004. The process proceeds to step S1110, at which the switch I/Fs 4007a and 4007b shown in FIG. 4 are set to the through mode (the mode to directly send the signal from the power switch 2008 to the printer engine 3004) as in the case of step S1102. Then at step S1111, the process waits for turning-on of the printer engine 3004 and returns.

In this manner, if the content of the flash ROM 3003a of the controller 3000 is updated, after the completion of update, an electric power-on signal is sent from the controller 3000 via the signal line 3023 to the printer engine 3004 so as to turn the electric power on, then the printer engine 3004 comes in an electric power-on status.

Next, processing to display the rewriting of the flash ROM 3003a as described above will be described.

Figure 12:
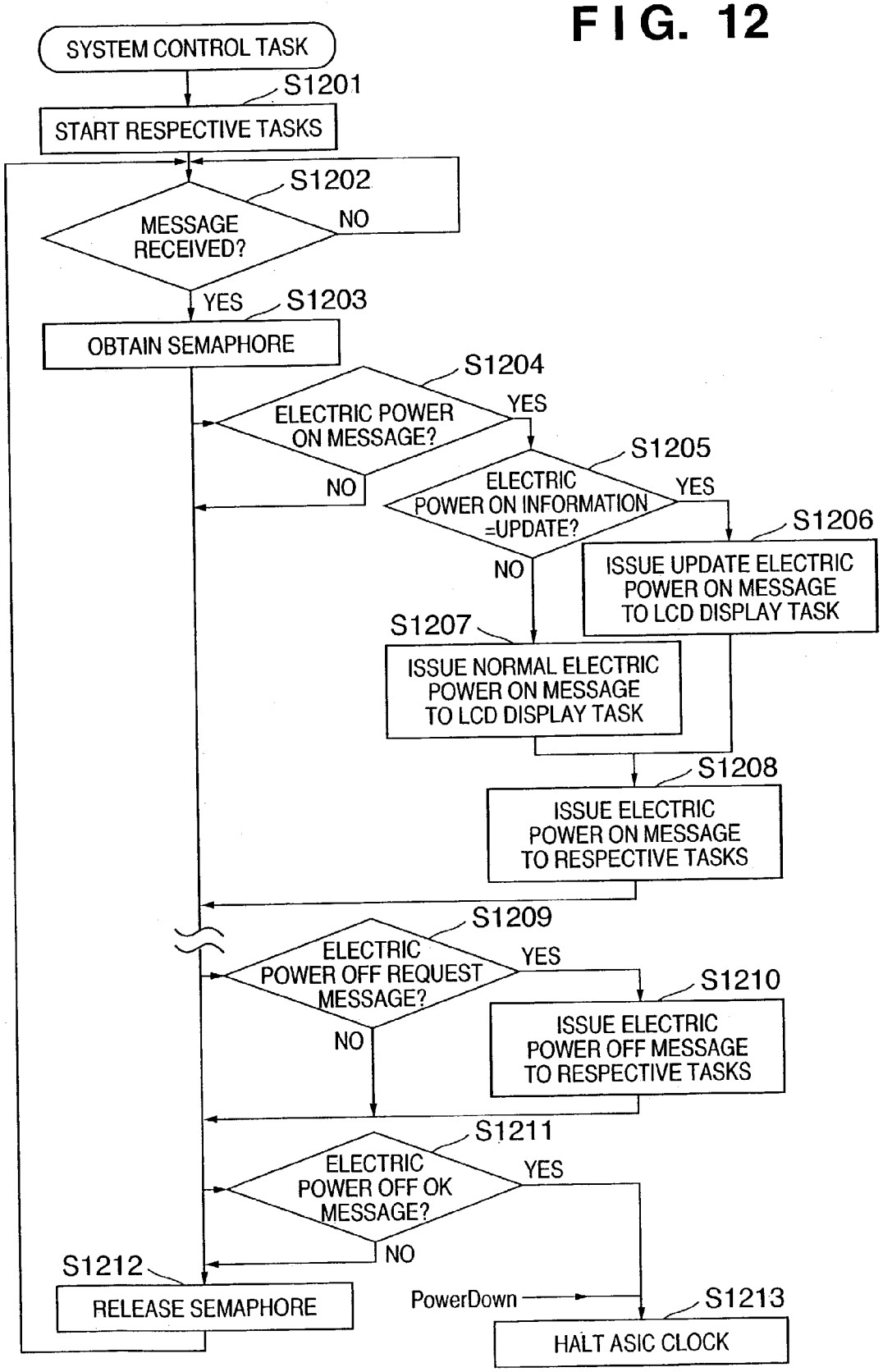
FIG. 12 is a flowchart showing processing by a system control task in FIG. 7.

FIG. 12 is a flowchart showing processing by the system control task in FIG. 7.

First, at step S1201, respective task are started, then at step S1202, reception of a message (task event) is waited, and at step S1203, a semaphore is obtained. If the message is an electric power-on message, the process proceeds from step S1204 to step S1205, at which it is determined based on the electric power-on information whether or not the flash ROM 3003a has been updated. If the flash ROM 3003a has been updated, the process proceeds to step S1206, at which an update electric power-on message is issued to the LCD display task (the task to perform display processing to the LCD display 1006 in FIG. 7) 8002. On the other hand, if the flash ROM 3003a has not been updated, the process proceeds to step S1207, at which a normal electric power-on message is issued to the LCD display task 8002 (FIG. 7). Then at step S1208, the electric power-on message is issued to the respective tasks, thereby respective tasks move to the electric power on mode.

Further, if it is determined at step S1209 that the message received at step S1202 is an electric power-off message, the process proceeds to step S1210, at which the electric power-off message is issued to the respective tasks.

Further, if it is determined at step S1211 that the message is an electric power-off OK message (ACK) to the electric power-off message, the process proceeds to step S1213, at which the semaphore obtained at step S1203 is released.

Figure 13:
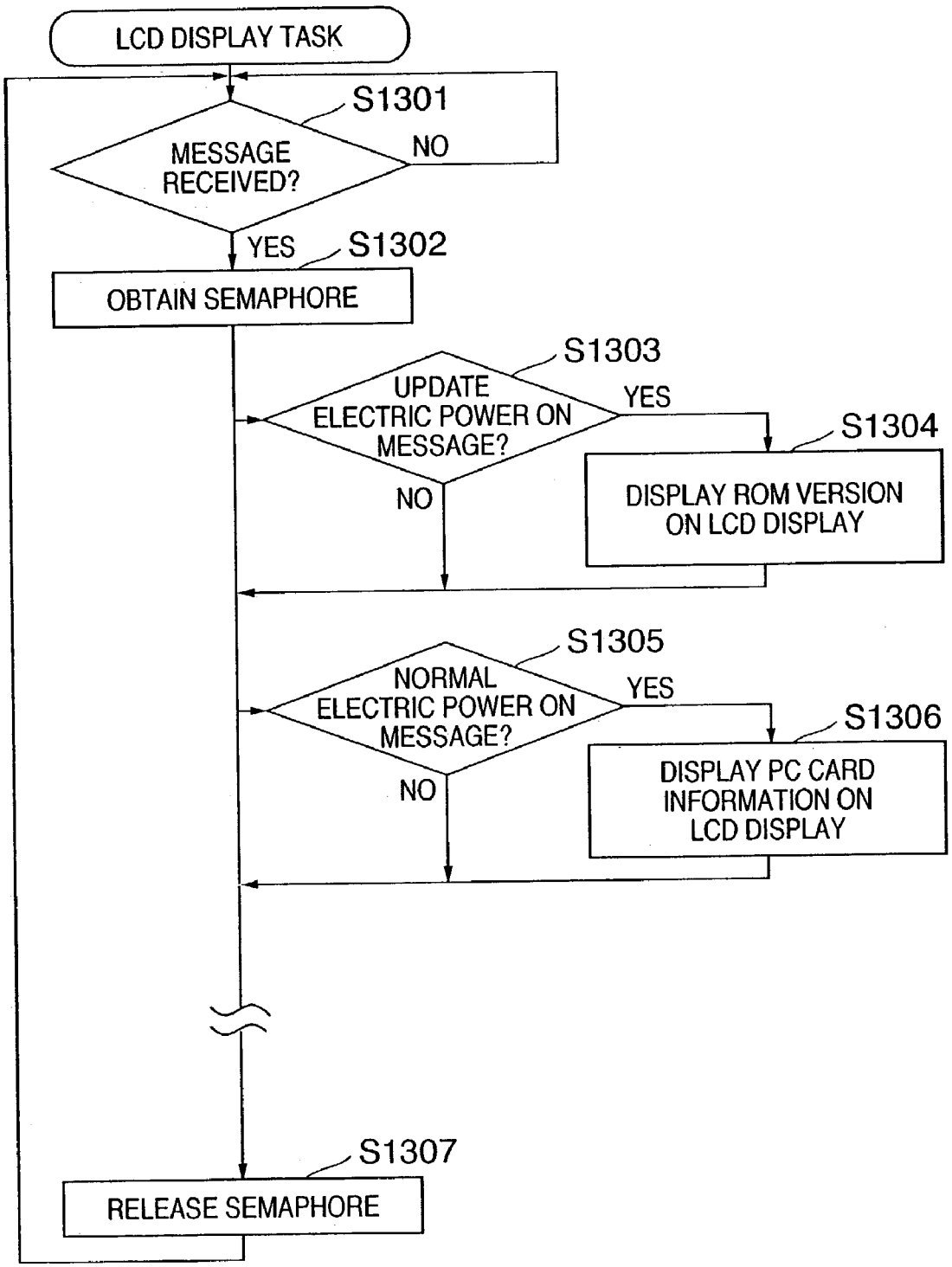
FIG. 13 is a flowchart showing processing by an LCD display task in FIG. 7.

FIG. 13 is a flowchart showing processing by the LCD display task.

Figure 14A:
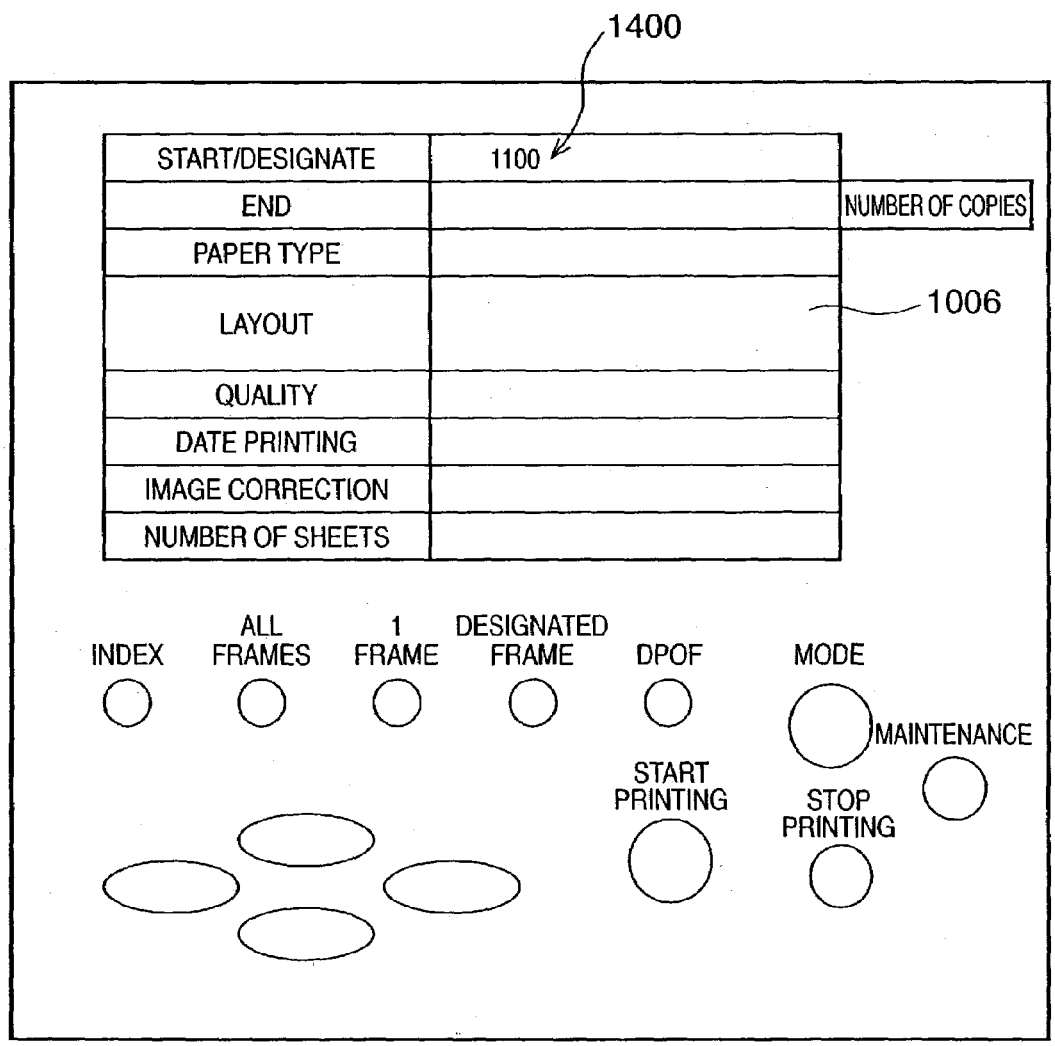

First, at step S1301, reception of a message (task event) is waited, and at step S1302, a semaphore is obtained. If the message is an update electric power-on message, the process proceeds from step S1303 to step S1304, at which version information of the flash ROM 3003a is displayed on the LCD display 1006. FIG. 14A shows this status. In FIG. 14A, information 1400 indicating the version (version "001" in this example) is displayed.

Further, if it is determined at step S1305 that the message is the normal electric power-on message, the process proceeds to step S1306, at which information as shown in FIG. 14B is displayed on the LCD display 1006.

FIG. 14B shows default display on the operation panel 1010. The start/designate "001" indicates the first image data among image data in the digital camera connected to the printing apparatus. Then at step S1307, the semaphore obtained at step S1302 is released.

In this manner, according to the present embodiment, in a case where the content of the flash ROM 3003a has been updated, the fact can be clearly displayed for the user, and further, information on the updated version can be displayed.

Further, as described above, the object of the present invention can be also achieved by providing a storage medium holding software program code for performing the aforesaid processes to a system or an apparatus, reading the program code with a computer (e.g., CPU, MPU) of the system or apparatus from the storage medium, then executing the program. In this case, the program code read from the storage medium realizes the functions according to the embodiment, and the storage medium holding the program code constitutes the invention. Further, the storage medium, such as a floppy disk, a hard disk, an optical disk, a magneto-optical disk, a CD-ROM, a CD-R, a DVD, a magnetic tape, a nonvolatile type memory card, and a ROM can be used for providing the program code.

Furthermore, besides aforesaid functions according to the above embodiment are realized by executing the program code which is read by a computer, the present invention includes a case where an OS (operating system) or the like working on the computer performs a part or entire actual processing in accordance with designations of the program code and realizes functions according to the above embodiment.

Furthermore, the present invention also includes a case where, after the program code is written in a function expansion card which is inserted into the computer or in a memory provided in a function expansion unit which is connected to the computer, a CPU or the like contained in the function expansion card or unit performs a part or entire actual processing in accordance with designations of the program code and realizes the functions of the above embodiment.

The present invention is not limited to the above embodiments and various changes and modifications can be made within the spirit and scope of the present invention. Therefore, to appraise the public of the scope of the present invention, the following claims are made.

What is claimed is:

1. An information processing apparatus for processing data received from an externally-connected apparatus, comprising:
    a first control unit having a memory for storing a program and having a register holding information to discriminate hard reset processing which is performed when the electric power is off and the electric power is supplied again or reset processing which is performed without cutting off the electric power, adapted to perform data transmission/reception with the externally-connected apparatus in accordance with said program; and
    a second control unit, supplied with electric power by a control signal from said first control unit, adapted to process data received via said first control unit,
    wherein in a case that the information held in the register indicates the hard reset processing, said first unit updates said program stored in the memory, and transmits the control signal to said second control unit after the update of said program has been completed.

2. The information processing apparatus according to claim 1, wherein when said second control unit receives the control signal to turn a power source on, the power source is turned on.

3. The information processing apparatus according to claim 1, wherein said first control unit determines whether or not said second control unit is in the reset status where the hard reset processing is performed, based on the information held in the register, and transmits the control signal to supply the electric power to said second control unit after release of the reset status.

4. The information processing apparatus according to claim 3, wherein said first control unit does not release the reset status of said second control unit while said program stored in the memory is being updated.

5. The information processing apparatus according to claim 1, wherein in a case where said first control unit detects that a predetermined key switch has been depressed upon electric power-on, said first control unit starts update of said program stored in said memory.

6. The information processing apparatus according to claim 1, further comprising means for setting said first control unit and said second control unit a soft electric power-on status after the completion of the update of said program stored in said memory.

7. The information processing apparatus according to claim 6, further comprising display control means for, after the soft electric power-on status, displaying the update of said program stored in said memory.

8. The information processing apparatus according to claim 7, wherein said display control means further displays version information of of said program stored in said memory.

9. The information processing apparatus according to claim 1, wherein said information processing apparatus is a printer apparatus, and wherein said first control unit includes a main control unit of the printer apparatus, further wherein said second control unit includes a printer engine of the printer apparatus.

10. A memory update method in an information processing apparatus for processing data received from an externally-connected apparatus, the image processing apparatus having a first control unit, having a register holding information to discriminate hard reset processing which is performed when the electric power is off and then the electric power is supplied again or reset processing which is performed without cutting off the electric power and having a memory for storing a program, that performs data transmission/reception with the externally-connected apparatus in accordance with the program, and a second control unit, supplied with electric power by a control signal from the first control unit, that processes data received via the first control unit,
    said method comprising the step of, in a case that the information held in the register indicates the hard reset processing, upon update of the program stored in the memory, transmitting the control signal from the first control unit to the second control unit after the update of the program has been completed.

11. The memory update method according to claim 10, wherein in said step, it is determined, based on the information held in the register of the first control unit, whether or not the second control unit is in the reset status where the hard reset processing is performed, and the control signal to supply the electric power is transmitted to the second control unit after release of the reset status.

12. The memory update method according to claim 10, wherein at said step, the reset status of the second control unit is not released while said program stored in the memory is being updated.

13. The memory update method according to claim 10, wherein if it is detected that a predetermined key switch has been depressed upon electric power-on, the update of the program stored in the memory is started.

14. The memory update method according to claim 10, further comprising the step of setting the first control unit and the second control unit into a soft electric power-on status after the completion of the update of the program stored in the memory.

15. The memory update method according to claim 14, further comprising a display control step of, after the soft electric power-on status, displaying the update of the program stored in the memory.

16. An image printing apparatus for printing based on data received from an externally-connected apparatus, comprising:
    a control unit having a memory for storing a program and information to discriminate hard reset processing which is performed when the electric power is off and then the electric is supplied again or reset processing which is performed without cutting off the electric power and a CPU for controlling data transmission/reception with the externally-connected apparatus in accordance with said program;

a printer engine, being initialized by a control signal indicating power-on from said control unit, adapted to perform printing based on data received via said control unit;

a power source unit, connected to a commercial AC power source, adapted to supply electric power to said printer engine;

determination means for, determining whether or not update of said program stored in said memory is instructed based on the information stored in the memory; and update means for, if said determination means determines that the update of said program is instructed, updating said program, wherein after completion of the update of said program by said update means, said control unit transmits the control signal to said printer engine.

17. The image printing apparatus according to claim 16, wherein said update means stores a program stored in a flash ROM into said memory.

18. The image printing apparatus according to claim 16, further comprising update display means for displaying the update of said program stored in said memory by said update means.

19. The image printing apparatus according to claim 16, wherein if a predetermined switch has been depressed when the electric power supply from said power supply unit has been started, said determination means determines that the update of said program stored in said memory has been instructed.

* * * * *